US009281715B2

(12) United States Patent
Lim et al.

(10) Patent No.: US 9,281,715 B2
(45) Date of Patent: *Mar. 8, 2016

(54) PARALELLING OF TWO TRANSFER SWITCHES

(71) Applicant: Briggs & Stratton Corporation, Wauwatosa, WI (US)

(72) Inventors: Sie Teong Lim, Brookfield, WI (US); Robert J. Hurd, Sr., Oconomowoc, WI (US); Kenny J. Stair, North Prairie, WI (US); Brandon M. Batzler, Hartford, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 406 days.

This patent is subject to a terminal disclaimer.

(21) Appl. No.: 14/044,246

(22) Filed: Oct. 2, 2013

(65) Prior Publication Data
US 2014/0042809 A1 Feb. 13, 2014

Related U.S. Application Data

(63) Continuation-in-part of application No. 13/008,083, filed on Jan. 18, 2011, now Pat. No. 8,569,912.

(51) Int. Cl.
*H02B 1/24* (2006.01)
*H02J 9/04* (2006.01)
*H02J 9/06* (2006.01)

(52) U.S. Cl.
CPC ... *H02J 9/04* (2013.01); *H02B 1/24* (2013.01); *H02J 9/066* (2013.01); *Y10T 307/344* (2015.04)

(58) Field of Classification Search
CPC .............. H02J 9/04; H02J 9/066; H02B 1/24; Y10T 307/344

USPC ................................................ 307/42, 38, 64
See application file for complete search history.

(56) References Cited

U.S. PATENT DOCUMENTS

| 4,177,389 | A | 12/1979 | Schott |
| 5,635,772 | A | 6/1997 | Lagree et al. |
| 6,137,191 | A | 10/2000 | O'Leary et al. |
| 6,331,798 | B1 | 12/2001 | O'Leary et al. |
| 6,465,912 | B1 | 10/2002 | Nakamura et al. |
| 6,747,369 | B2 * | 6/2004 | Griffith ................... H02J 1/102 307/43 |
| 6,876,103 | B2 | 4/2005 | Radusewicz et al. |
| 7,015,599 | B2 * | 3/2006 | Gull ........................ H02J 3/005 307/64 |
| 7,692,332 | B2 | 4/2010 | Nordman et al. |

(Continued)

*Primary Examiner* — Jared Fureman
*Assistant Examiner* — Michael Warmflash
(74) *Attorney, Agent, or Firm* — Andrus Intellectual Property Law, LLP

(57) ABSTRACT

A backup power management system connectable to a primary power source and a secondary power source, and a method of operating the same. The system includes an enclosed housing that receives a control system including first and second controllers that are connected to a first transfer switch contactor and a second transfer switch contactor within the housing. Both the primary power source and a secondary power source are broken into two separate output supplies. The two separate output supplies from the primary power source and the secondary power source are each provided to one of the first and second transfer switch contactors. The control system sends signals to the first and second transfer switch contactors to control the movement of the contactors between first and second positions. The power management system can also include a load management controller to control the load on the secondary power source.

19 Claims, 7 Drawing Sheets

(56) References Cited

U.S. PATENT DOCUMENTS

| | | | | |
|---|---|---|---|---|
| 8,569,912 B2 * | 10/2013 | Lim | ................ | H02B 1/24 307/38 |
| 2004/0070278 A1 | 4/2004 | Divan et al. | | |
| 2008/0080104 A1 | 4/2008 | Yagudayev et al. | | |
| 2010/0225167 A1 * | 9/2010 | Stair | ................ | H02J 3/14 307/29 |
| 2012/0181872 A1 * | 7/2012 | Lim | ................ | H02B 1/24 307/70 |

* cited by examiner

PARALELLING OF TWO TRANSFER SWITCHES

CROSS-REFERENCE TO RELATED APPLICATION

The present application is a continuation-in-part application of U.S. patent application Ser. No. 13/008,083 filed Jan. 18, 2011.

BACKGROUND OF THE DISCLOSURE

The present disclosure generally relates to backup power supply systems. More specifically, the present disclosure relates to a transfer switch for use in a backup power supply system that includes a pair of transfer switch contactors in an enclosure that are controlled by a single controller or a pair of controllers.

BACKGROUND OF THE INVENTION

Backup power supply systems typically include a generator that is connected to a transfer switch. When the transfer switch determines that a primary power source, such as a utility power supply, has been interrupted, a controller in the transfer switch determines whether a secondary power source, such as a standby generator, is operating. If the secondary power source is operating and providing an acceptable level of current and voltage, a controller in the transfer switch causes a transfer switch contactor to disconnect power from the primary power source and connect the secondary power source to a distribution panel for the building or home being serviced by the primary source.

In a business or residence serviced by a 400 amp utility power supply. currently available systems include either two separate 200 amp transfer switches, each of which include a transfer switch controller, or a single 400 amp transfer switch. In the system having two 200 amp transfer switches, each transfer switch includes a housing that includes a separate pair of transfer switch contactors and a separate controller. In a system including a single transfer switch that can handle the 400 amp service, the transfer switch panel must be much larger, which often is unacceptable in the limited space available for the transfer switch.

SUMMARY OF THE INVENTION

The present disclosure relates to a transfer switch that controls the connection of either a primary power source or a secondary power source to a distribution panel within a building. The transfer switch includes a control system that controls the position of a pair of transfer switch contactors.

The backup power management system of the present disclosure includes a: primary power source, such as the utility power supply, that provides power to a plurality of loads located within a building. Since the primary power source requires relatively large components to handle the amount of current present, the primary power source is supplied to a splitter that divides the power from the primary power source into a first primary output and a. second primary output.

Since the building normally receives the primary power source, the backup power management system is designed including a secondary power source that provides the same level of voltage and current to power loads within the building. The secondary power source can be various different types of backup generators, which can be either mounted in a stationary location outside of the building or, in some cases, comprise a portable generator. Since the secondary power source supplies the same service, the secondary power supply requires relatively large components. Therefore, the secondary power source is supplied to a secondary power splitter that divides the secondary power source into a first secondary output and a second secondary output.

Once the primary power source has been divided into the first primary output and the second primary output, the first primary output is supplied to a first transfer switch contactor. The second primary output is supplied to a second transfer switch contactor.

The first transfer switch contactor also receives the first secondary output from the secondary power source. The second transfer switch contactor receives the second secondary output from the secondary power source.

Both the first transfer switch contactor and the second transfer switch contactor include internal switches and/or relays that are movable between a first position and a second position. When the first and second transfer switch contactors are in the first position, the primary power source is connected to the distribution panels through the respective first or second transfer switch contactor. Likewise, when the first and second transfer switch contactors are in the second position the secondary power source is connected to the distribution panels through the respective first and second transfer switch contactors.

A transfer switch control system is in operative communication with both the first transfer switch contactor and the second transfer switch contactor. The transfer switch control system, which can include a single or multiple controllers, generates control signals to both the first transfer switch contactor and the second transfer switch contactor to control movement of the contactors between the first and second positions. In this manner, the control system controls the position of the first and second transfer switch contactors to control whether the primary power source or the secondary power source is connected to the first and second distribution panels. The control system operates such that the first and second transfer switch contactors are always in the same position such that either the primary power source or the secondary power source are provided to the distribution panels.

In one embodiment of the disclosure, the controller can be a single controller contained within an enclosed housing of the transfer switch. In an alternate embodiment of the disclosure, the controller can include both a first controller and a second controller. In the second embodiment, the first controller is in communication with the first transfer switch contactor while the second controller is in communication with the second transfer switch contactor such that the first and second controllers control the movement of the respective first and second transfer switch contactors. The first and second controllers are in communication with each other such that the first and second controllers coordinate the simultaneous movement of the first and second transfer switch contactors between their respective first and second positions.

During operation, the control system monitors for the loss of the primary power source. If the primary power source is lost for more than a brief period of time, the control system determines whether the secondary power source is activated and able to supply power to the building. If the secondary power source is active, the control system generates signals to the first and second transfer switch contactors Which cause both the first and second transfer switch contactors to move from the first position to the second position. Once the first and second transfer switch contactors are in the second position, the home is supplied with power from the secondary power source.

Once the primary power source returns, the control system generates signals to the first and second transfer switch contactors to move the first and second switch contactors back to the first position. As described, when the first and second transfer switch contactors are in the first position, the primary power source is supplied to the distribution panel in the building.

In the manner described above, the control system is used to control the position of two separate transfer switch contactors. Each of the transfer switch contactors receives a 200 amp service, which is half of the 400 amp primary power source or secondary power source. In this manner, the control system can control both of the transfer switch contactors and the transfer switch contactors can be smaller than contactors required for 400 amp service.

In addition to the transfer switch controller, a load management controller can also be included in the transfer switch housing. The load management controller functions to selectively shed and subsequently reconnect loads to the power distribution system depending upon the power drawn by the loads and the power available from the secondary power source.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
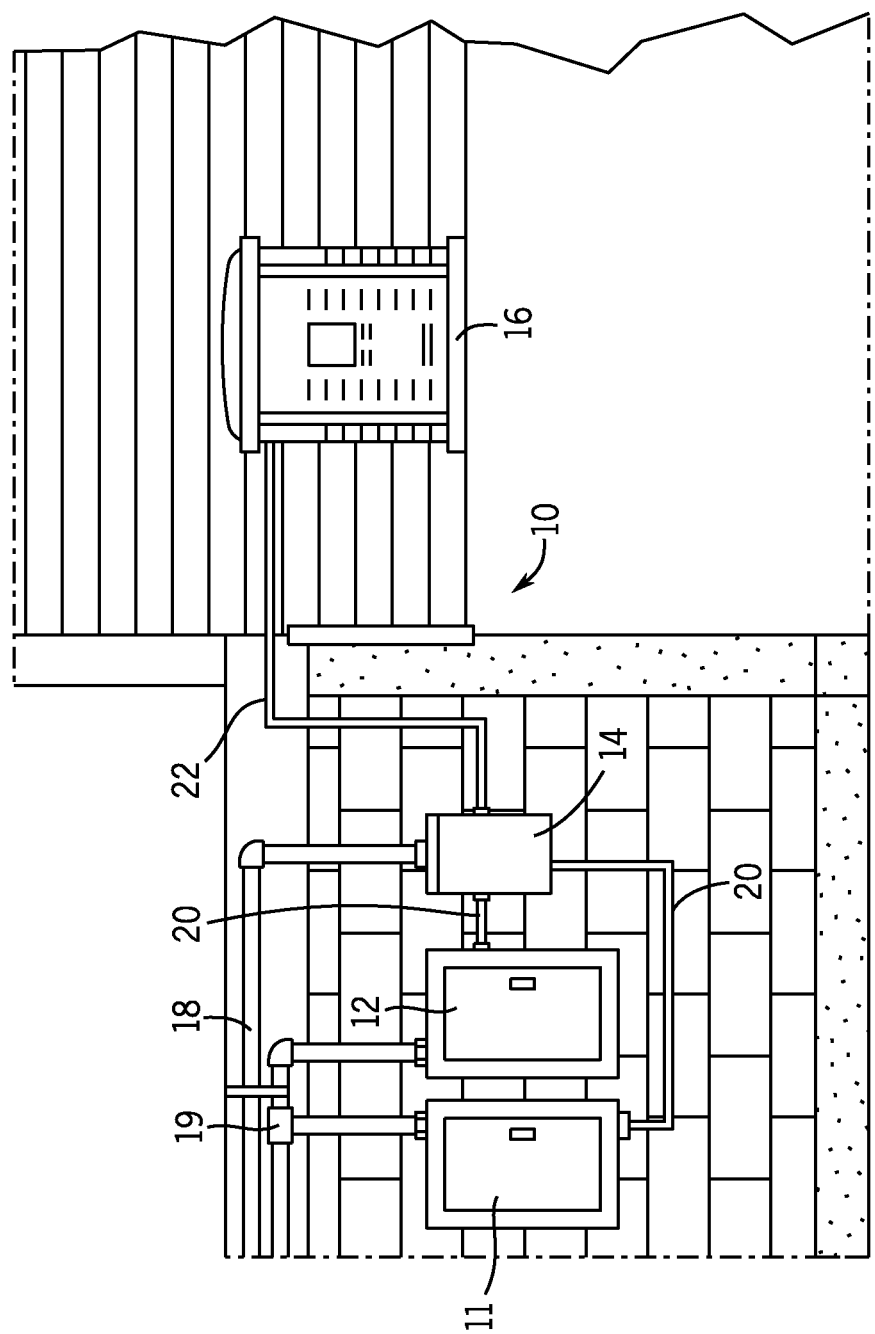
FIG. 1 illustrates a utility distribution panel and a transfer switch connected to a generator in accordance with the present disclosure.

FIG. 1 illustrates a power distribution system constructed in accordance with the present disclosure. The power distribution system 10 includes a first utility distribution panel 11, a second utility distribution panel 12, a transfer switch 14, and a generator 16. The transfer switch 14 is connected to a primary power source, such as a utility, through conduit 18. The distribution panels 11 and 12 supply power to a plurality of loads within the building through a conduit 19. The distribution panels 11 and 12 include a plurality of circuit breakers and/or fuses that provide surge and over-current protection for non-essential loads associated with the building.

Conductors are routed between the utility distribution panels 11 and 12 and the transfer switch panel 14 within conduits 20. For example, conductors associated with a utility service (one or more hot conductors, a neutral conductor, a ground conductor) as well as conductors associated with components of the residence or other building can be routed through the conduits 20 and the load distribution panels 11 and 12 to the transfer switch panel 14 through the conduit 20. In the embodiment shown in FIG. 1, the distribution panels 11 and 12 and the transfer switch panel 14 are positioned relatively close to one another, thereby requiring a relatively short section of conduit 20. However, in other embodiments, the utility distribution panels 11 and 12 and the transfer switch panel 14 may be positioned further from each other. As an example, the transfer switch panel 14 may be positioned in an alternate area of the building, thereby requiring a longer conduit 20.

In some embodiments, the transfer switch panel 14 includes fuses and/or circuit breakers associated with essential devices of the building. In other embodiments, the transfer switch panel can have only service rated breakers to provide power to the distribution panels 11 and 12. Additionally, as will be described in greater detail below, the transfer switch panel 14 includes a pair of transfer switch contactors that are operated to transfer loads from the primary power source to the secondary power source, In the embodiment shown in FIG. 1, the secondary power source is the standby generator 16 positioned outside the residence. However, the generator 16 could be a portable generator that can be relatively easily moved from one location to another. In the embodiment illustrated, the generator 16 may be of any size, depending upon the number and power requirements of the essential devices. As illustrated in FIG. 1, the transfer switch panel 14 is connected to the generator 16 through conduit 22. The conduit 22 allows the transfer switch panel 14 to monitor the operation of the generator 16, to receive power from the generator. and to initiate operation of the generator 16 upon loss of the primary power source.

Figure 2:
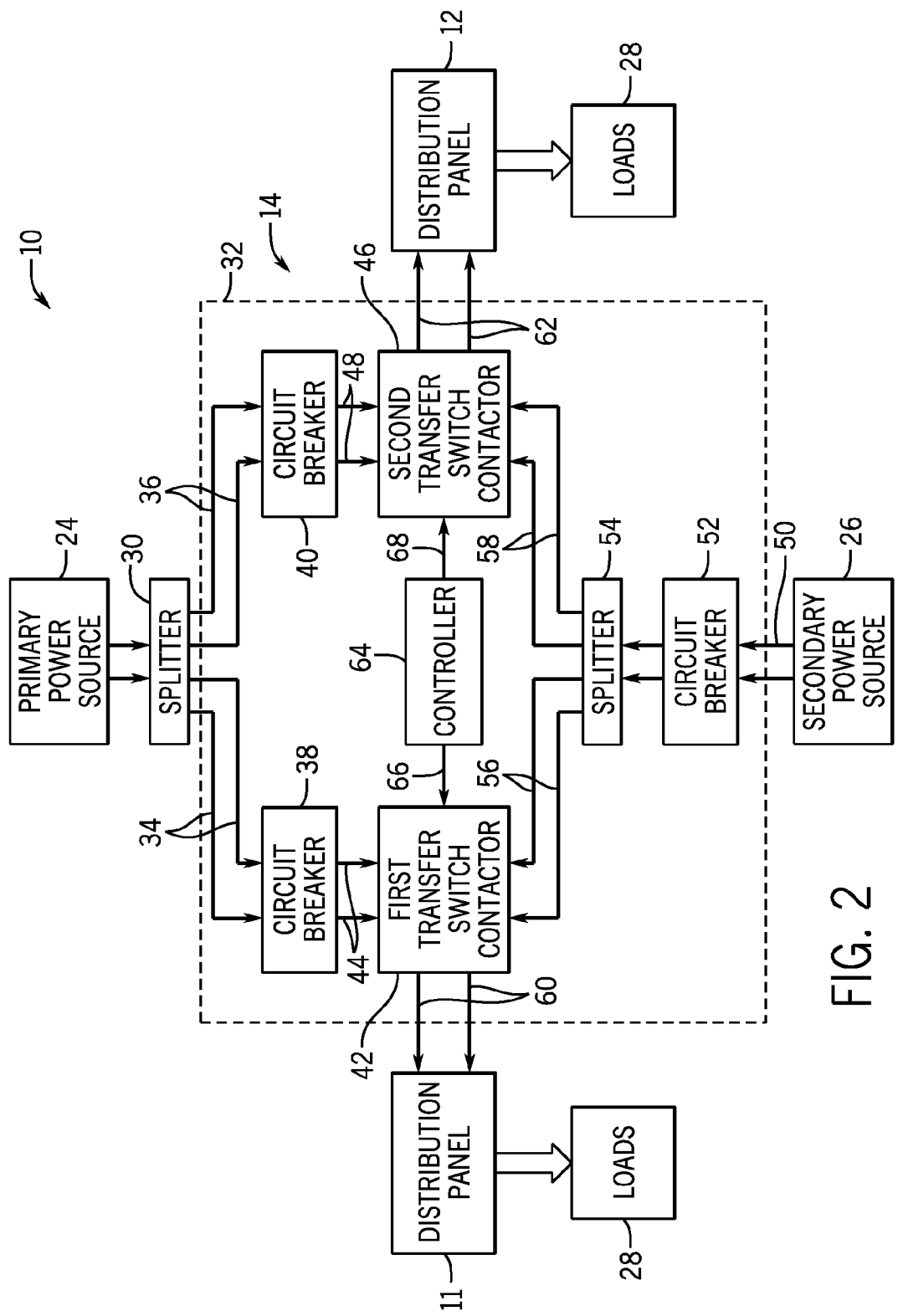
FIG. 2 is a block diagram of a backup power management system embodying the present disclosure.

FIG. 2 provides a schematic illustration of the power distribution system 10 of the present disclosure. As described previously with reference to FIG. 1, the power distribution system 10 includes a primary power source 24, a secondary power source 26 and the distribution panels 11 and 12. In the embodiment shown in FIG. 2, the distribution panels 11 and 12 are shown broken into two separate components. However, it should be understood that the distribution panels 11 and 12 could be a single panel. The distribution panels 11 and 12 feed a plurality of loads 28 distributed throughout the residence including the power distribution system 10.

In the embodiment shown in FIG. 2, the primary power source 24 is provided to a splitter 30. The splitter 30 is shown positioned outside of the transfer switch housing 32. However, it is contemplated that the splitter 30 could be located within the housing 32 while operating within the scope of the present disclosure.

The splitter 30 splits the primary power source 24 into a first primary output available along lines 34 and a second primary output available along lines 36. In the embodiment illustrated in FIG. 2, the first primary output available along lines 34 is fed into a first circuit breaker 38 while the second primary output on lines 36 is fed to a second circuit breaker 40. In the embodiment shown in FIG. 2, the circuit breakers 38, 40 are shown located within the housing 32. However, the circuit breakers 38, 40 could be located outside of the housing 32 while operating within the scope of the present disclosure.

The first primary output is provided to terminals of a first transfer switch contactor 42 along lines 44. Likewise, the second primary output is supplied to the terminals of second transfer switch contactor 46 through lines 48.

The secondary power source 26 provides power to the power distribution system 10 along input lines 50. The secondary power source 26 supplies power through a circuit breaker 52. In the embodiment shown in FIG. 2, the circuit breaker 52 is located within the housing 32 of the transfer switch 14.

The secondary power source is supplied to a secondary power splitter 54. Like the power splitter 30 described previously, the secondary power splitter 54 splits the power supply from the secondary power source 26 into two separate power outputs. Specifically, a first secondary output is present on lines 56 while a second secondary output is available on lines 58. The first secondary output is supplied to terminals of the first transfer switch contactor 42 while the second secondary output is supplied to terminals of the second transfer switch contactor 46.

As is blown, the first transfer switch contactor 42 and the second transfer switch contactor 46 each include internal switches or relays that control which of the two input power supplies are present on the output lines 60, 62 that each feed two separate distribution panels 11 and 12. Specifically, each of the first and second transfer switch contactors 42, 46 are movable between a first position and a second position. When the transfer switch contactors 42, 46 are in the first position, the primary power source 24 is supplied to the distribution panel 12 through the transfer switch contactors 42, 46. When the transfer switch contactors 42, 46 are in the second position, the secondary power source 26 is supplied to the distribution panels 11 and 12. Thus, the position of the transfer switch contactors 42, 46 controls whether the primary power source 24 or the secondary power source 26 are supplied to the distribution panels 11 and 12.

Figure 6:
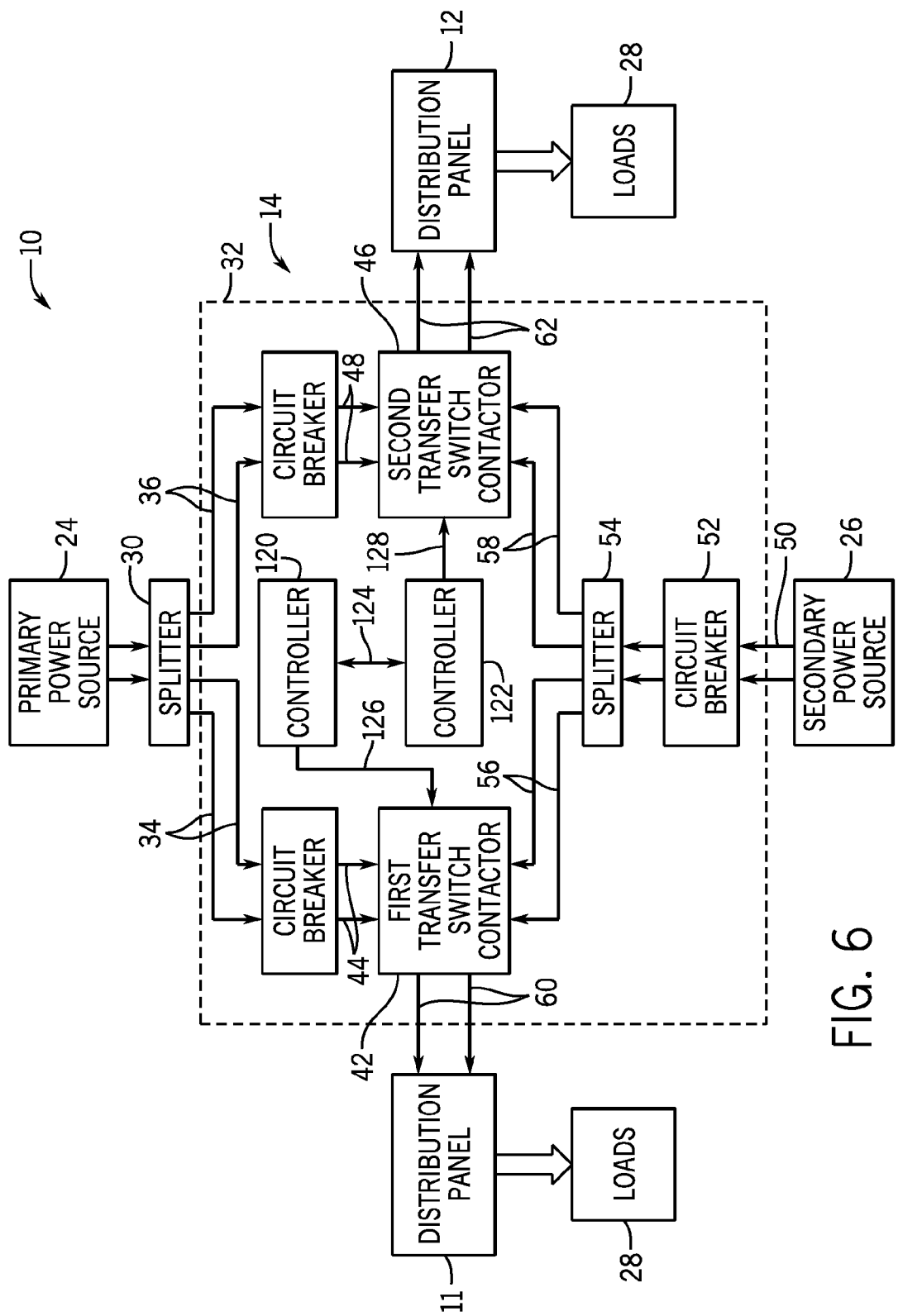
FIG. 6 is a block diagram of a backup power management system embodying a second embodiment of the present disclosure.

In the embodiment shown in FIG. 2, the transfer switch 14 includes a control system comprised of a single controller 64 that is operatively connected to both the first transfer switch contactor 42 and the second transfer switch contactor 46. Although a single controller 64 is shown in the embodiment of FIG. 2, it is contemplated that the control system of the transfer switch 14 could include two separate controllers, as in the embodiment shown in FIG. 6 to be discussed below. Thus, the term "control system" should be interpreted throughout the disclosure as embodying either a single controller 64 as shown in FIG. 2 or two or more separate controllers such as shown in the embodiment of FIG. 6.

The single controller 64 monitors for whether the primary power source 24 is available. If the primary power source 24 is disrupted, the single controller 64 generates activation signals along lines 66 and 68 to control the position of the first and second transfer switch contactors 42, 46. As an illustrative example, if the controller 64 determines that the primary power source 24 has become disrupted, the determines whether the secondary power source is running and power is available. If the secondary power source is miming, the controller 64 generates a signal along line 66 to cause the first transfer switch contactor 42 to move to the second position such that the secondary power source 26 is supplied to the first distribution panel 11. At the same time, the controller 64 generates a signal along line 68 to the second transfer switch contactor 46 which moves the second switch contactor 46 to the second position, thereby causing the secondary power source 26 to be supplied to the second distribution panel 12.

When the primary power source 24 returns, the controller 64 again generates signals along lines 66 and 68 to move both the first transfer switch contactor 42 and the second transfer switch contactor 46 back to the first position such that the primary power source 24 is supplied to the distribution panels 11 and 12. In this manner, the single controller 64 controls both the first transfer switch contactor 42 and the second transfer switch contactor 46. In prior systems, a separate transfer panel including its own controller was required to control the movements of the separate transfer switch contactors. In accordance with the present disclosure, the single controller 64 is included within the housing 32 along with the first transfer switch contactor 42 and the second transfer switch contactor 46. Thus, the single controller 64 can control the operation of both of the contactors 42, 46.

Figure 3:
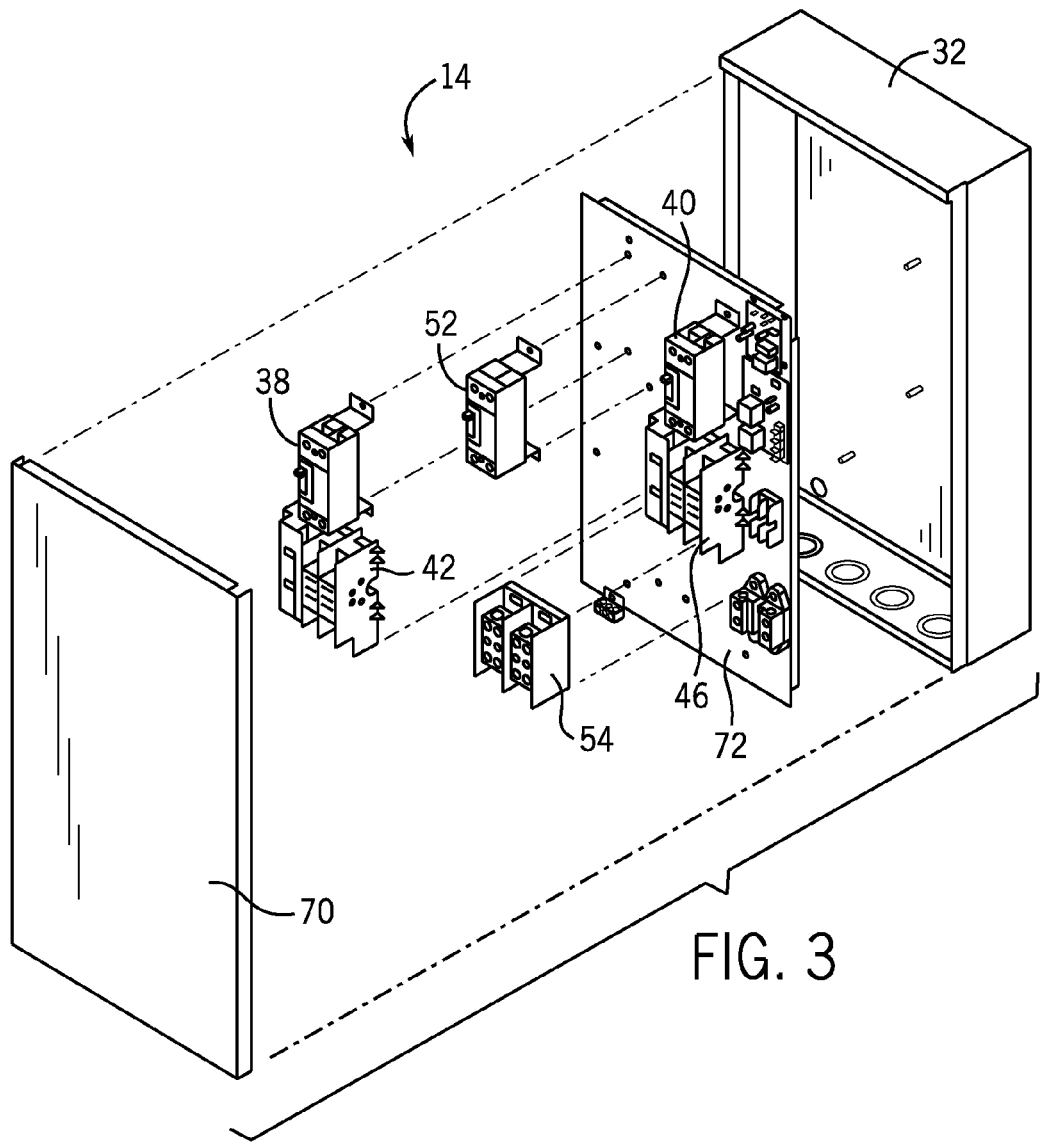
FIG. 3 is an exploded perspective view of a transfer switch of the present disclosure.
Figure 4:
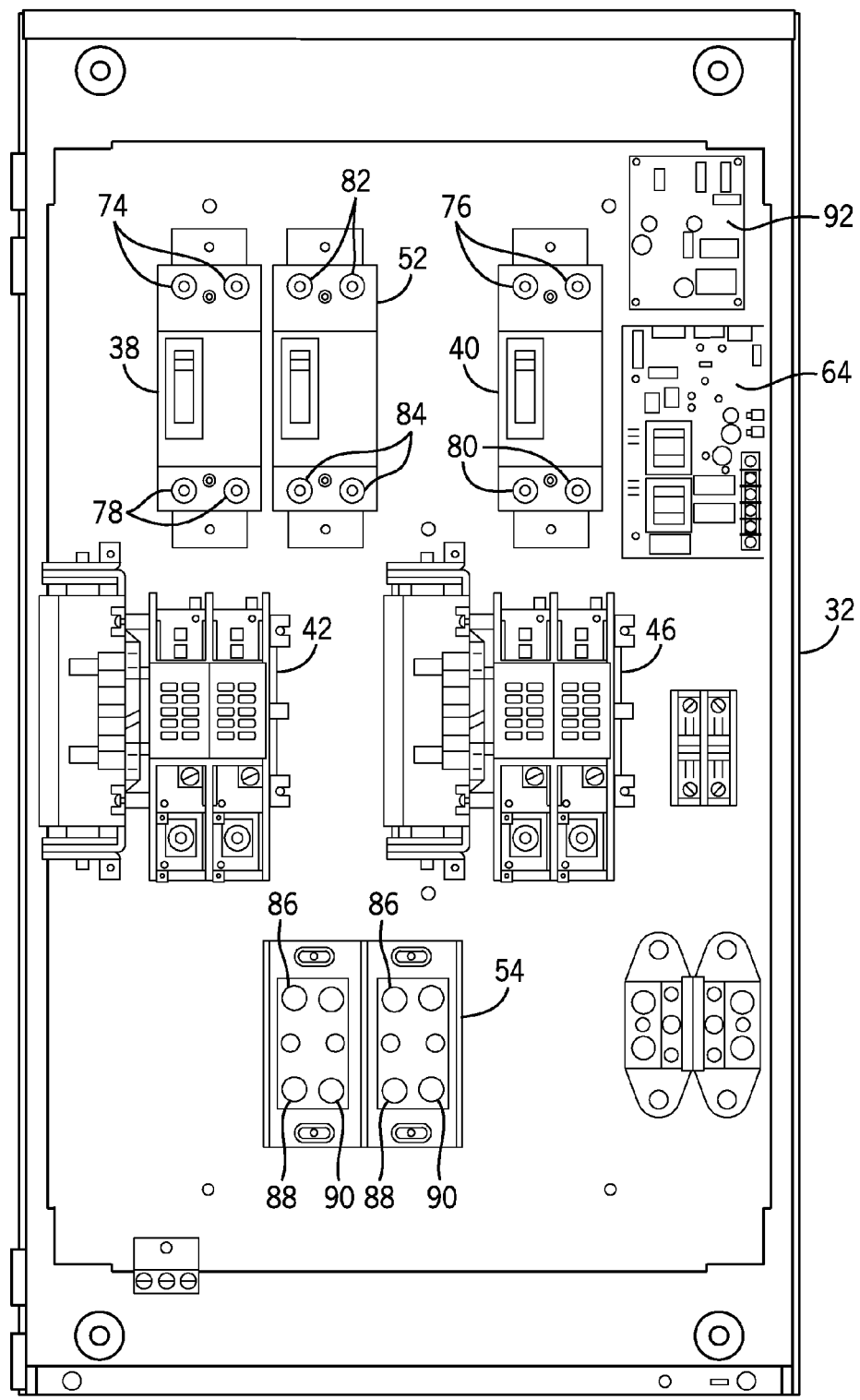
FIG. 4 is a front view of the transfer switch shown in FIG. 3.

FIGS. 3 and 4 illustrate a specific physical configuration of the transfer switch 14 of the present disclosure. The transfer switch 14 includes the enclosed housing 32 having a front panel 70. The combination of the housing 32 and the front panel 70 enclose a mounting platform 72 onto which the operating components of the transfer switch 14 are mounted. As described previously with reference to FIG. 2, circuit breaker 38 receives the first primary output from the primary power source at a pair of input terminals 74. Likewise, circuit breaker 40 receives the second primary output from the primary power source at the input terminals 76. The output terminals 78, 80 of the circuit breakers 38, 40 are connected to the first transfer switch contactor 42 and the second transfer switch contactor 46 as shown in FIG. 2.

Referring back to FIG. 4, the secondary power source is connected to the input terminals 82 of the circuit breaker 52. Output terminals 84 are connected to input terminals 86 of the splitter 54. Output terminals 88 are connected to the first transfer switch contactor 42 while the output terminals 90 are connected to the second transfer switch contactor 46.

As previously described, the position of each of the first and second transfer switch contactors 42, 46 are controlled by control signals generated by the single controller 64. In the embodiment shown in FIG. 4, the controller 64 is contained on a circuit board mounted within the housing 32 and operates in the manner to be described below to control the position of the first and second transfer switch contacts 42, 46.

In addition to the transfer switch control system, a load management controller 92 is also contained within the transfer switch housing 32. The load management controller 92 functions to selectively shed loads from the power distribution system and subsequently reconnect the loads to the power distribution system depending upon the amount of power drawn by the loads and the power available from the generator. The details of load management control board can vary depending upon the particular power distribution system. The details of one exemplary load management controller and its method of operation are set forth in U.S. Pat. No. 8,415,830, the disclosure of which is incorporated herein by reference. However, other types of load management systems and methods of operation are contemplated as being within the scope of the present disclosure. The load management controller 92 is contained within the transfer switch housing 32 such that both the transfer switch and the power management components required to selectively shed/reconnect loads within the home serviced by the generator can be installed as a single device contained within the transfer switch housing 32.

In the embodiment shown in the Figures, the power distribution system 10 includes a pair of circuit breakers 38, 40 associated with the primary power source and a circuit breaker 52 associated with the secondary power source 26. Although these circuit breakers are desirable, it is contemplated that the circuit breakers 38, 40 and 52 could be eliminated from the system shown and described while still operating within the scope of the present disclosure. Further, although the circuit breakers 38, 40 and 52 are shown within the housing 32, it is contemplated that the circuit breakers could be removed from the housing 32 while also operating within the scope of the present disclosure.

In the embodiment shown in FIG. 2, both the first transfer switch contactor 42 and the second transfer switch contactor 46 are contactors configured such that the internal contacts within each contactor are biased to a default position in which the contactors assume the first position. As described previously, when the first and second transfer switch contactors 42, 46 are in the first position, the primary power supply 24 is directed to the distribution panels 11 and 12. Thus, if the contactors 42, 46 or the controller 64 malfunctions, the first and second transfer switch contactors 42, 46 assume a default position in which the primary power source 24 is connected to the distribution panels 11 and 12. This type of biasing is preferable as compared to a situation in which the first transfer switch contactor 42 and the second transfer switch contactor 46 would remain in the second position and connect the secondary power source 26 to the distribution panels 11 and 12. Since it is likely that the primary power source 24 will be only briefly interrupted, a default position in which the first and second transfer switch contactors 42, 46 remain in the first position will result in power being supplied to the distribution panels 11 and 12 when the utility source returns.

Figure 5:
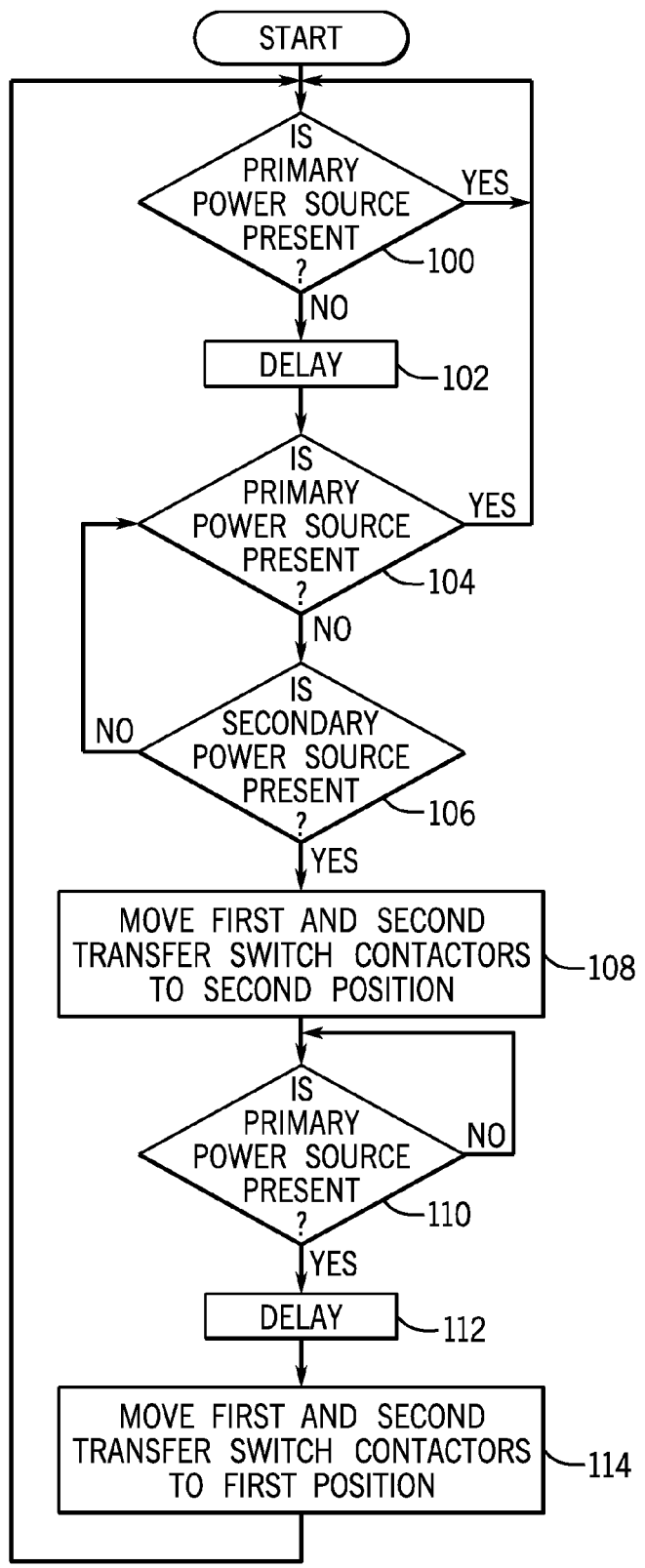
FIG. 5 is a flowchart illustrating the operating sequence carried out by the transfer switch of the present disclosure.

FIG. 5 illustrates the operating sequence carried out by the single controller 64 shown in FIG. 2. Initially, the controller determines in step 100 whether the primary power source is present. If the primary power source is present, the controller continues to monitor for the presence of the primary power source and the first and second transfer switch contactors remain in the first position in which the primary power source is supplied to the distribution panels.

If the controller determines in step 100 that the primary power source is no longer present, the controller initially delays in step 102 before the system determines again whether the primary power source is present in step 104. The delay step insures that the system does not transfer power from the primary power source to the secondary power source upon a very brief interruption in the utility power supply.

If the primary power source is not present after the delay, the controller determines in step 106 whether the secondary power source is present. In this step, the controller 64 determines whether the secondary power source, such as the standby generator, is activated and able to supply electrical power to the loads of the residence serviced by the transfer panel.

If the secondary power source is present and ready to supply power, the controller generates control signals to move the first and second transfer switch contactors to the second position, as shown in step 108. When the first and second transfer switch contactors are in the second position, power from the secondary power source is supplied to the power distribution panel. The controller keeps the first and second transfer switch contactors in the second position until the system determines in step 110 that the primary power source is again present.

When the controller determines that the primary power source is present in step 110, the system again delays in step 112 before moving the first and second transfer switch contactors to the first position in step 114. Once again, the delay required in step 112 insures that the primary power source has returned prior to switching from the secondary source back to the primary power source.

In the second embodiment shown in FIG. 6, the control system includes a first controller 120 and a second controller 122. The first and second controllers 120, 122 communicate with each other through a communication line 124. The first controller 120 is operatively connected to the first transfer switch contactor 42 through the communication line 126. Likewise, the second controller 122 is operatively connected to the second transfer switch contactor 46 through communication line 128. Although a hardwire connection between the controllers 120 and 122 is shown, it is contemplated that the controllers 120 and 122 could communicate with each other through any one of multiple wireless communication protocols while operating within the scope of the present disclosure.

The first and second controllers 120, 122 each monitor for whether the primary power source 24 is available. If the primary power source 24 is disrupted, the first and second controllers 120, 122 communicate with each other through communication line 124. If the first and second controllers 120, 122 confirm with each other that the primary power source 24 has been disrupted, the first and second controllers 120, 122 coordinate the generation of activation signals to the first and second transfer switch contactors 42, 46. Specifically, the first controller 120 generates an activation signal along line 126 to control the position of the first transfer switch contactors 42 While the second controller 122 generates an activation signal along line 128 to control the position of the second transfer switch contactor 46.

When the primary power source 24 returns, the first and second controllers 120, 122 communicate with each other to confirm the return of the primary power source. If the return of the primary power source is confirmed, the first and second controllers 120, 122. coordinate the movement of the first and second transfer switch contactors back to the first position such that the primary power source 24 is supplied to the distribution panels 11 and 12.

As can he understood by the discussion above, communication between the first controller 120 and the second controller 122 is required to insure that the first and second transfer switch contactors 42, 46 move in unison with each other such that the supply of power from either the primary power source 24 or the secondary power source 26 to the respective distribution panels 11, 12 is coordinated.

Alternatively, it is contemplated that the first and second controllers 120, 122 could communicate with each other such that only the first transfer switch contactors 42 or the second transfer switch contactors 46 are moved between the first. and second positions to selectively control power to the distribution panels 11 and 12. In such a situation, the coordination of the two controllers 120, 122 can separately energize the distribution panels 11 and/or 12.

Figure 7:
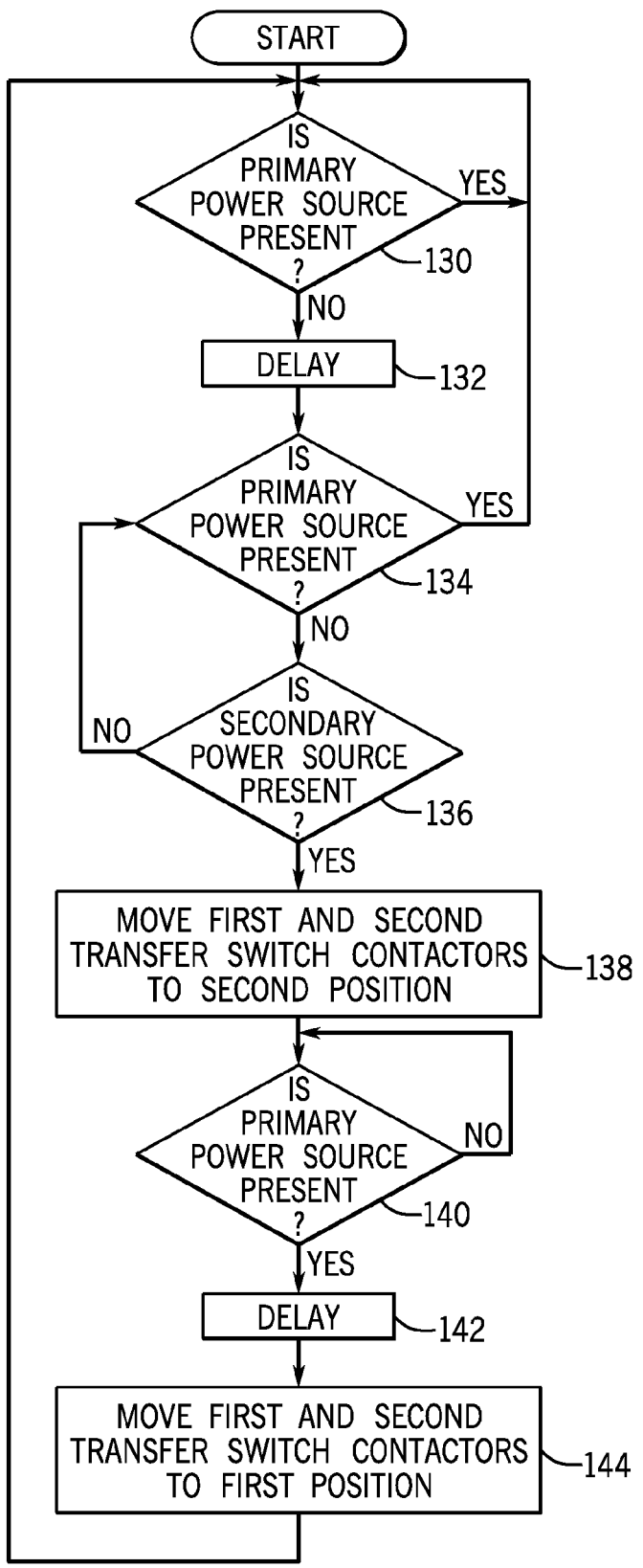
FIG. 7 is a flowchart illustrating the operating sequence carried out by the transfer switch of the present disclosure when the transfer switch includes both a first controller and a second controller.

FIG. 7 illustrates the operating sequence carried out by the first controller 120 and the second controller 122 shown in FIG. 6. The operating sequence shown in FIG. 7 is similar to the operating sequence shown in FIG. 5 for the single controller 64.

Initially, the pair of controllers determine in step 130 whether the primary power source is present. As indicated previously, the first and second controllers 120, 122 communicate with each other to confirm whether the primary power source is present or whether the power has been disrupted.

If the primary power source is present, as confirmed by both of the two controllers, the pair of controllers continue to monitor for the presence of the primary power source and the first and second transfer switch contactors remain in the first position in which the primary power source is supplied to the distribution panels.

If the controllers determine in step 130 that the primary power source is no longer present, the pair of controllers initially delay in step 132 before the system again determines whether the primary power source is present in step 134. The delay step 132 insures that the system does not transfer power from the primary power source to the secondary power source upon a very brief interruption in the utility power supply.

If the primary power source is not present after the delay, the pair of controllers determines in step 136 whether the secondary power source is present. As discussed previously, the pair of first and second controllers communicates with each other to determine whether both of the controllers sense the secondary power source, which can be a standby generator. If the secondary power source is activated and able to supply electrical power to the loads of the residence serviced by the distribution panels.

If the secondary power source is present and ready to supply power, the first controller generates a control signal to move the first transfer switch contactors to the second position while the second controller generates a control signal to move the second transfer switch contactors to the second position, as shown in step 138. When the first and second transfer switch contactors are in the second position, power front the secondary power source is supplied to the power distribution panels. The first and second controllers keep the first and second transfer switch contactors in the second position until the system determine in step 140 that the primary power source is again present.

When either of the first and second controllers 120, 122 senses the return of the primary power source, the first and second controllers again communicate with each other to confirm that the primary power source is present. If the first and second controllers confirm that the primary power source is present, the first controller moves the first transfer switch contactors to the first position While the second controller moves the second transfer switch contactors to the first position, as shown in step 144. Once again, the delay required in step 142 insures that the primary power source has returned prior to switching from the second source back to the primary power source.

Referring back to FIG. 4, in an embodiment that includes both a first and a second controller, the additional controller can be mounted at any open location on the circuit board contained within the enclosed housing 32. In the second embodiment that includes both the first and second controllers, both of the first and second controllers are positioned within the enclosed housing 32 such that the transfer switch can be supplied as a single, self-contained unit. The first and second controllers, when mounted to the mounting platform, are in communication with each other as well as in communication with the respective first and second transfer switch contactors 42, 44.

We claim:

1. A self-contained transfer switch for use in a backup power management system including a primary power source, a primary power splitter that receives power from the primary power source and divides the power into a first primary output and a second primary output, a secondary power source, first and second distribution panels and a plurality of loads, comprising:
    an enclosed housing;
    a secondary power splitter contained in the housing that receives power from the secondary power source and divides the power into a first secondary output and a second secondary output;
    a first transfer switch contactor contained in the housing that receives the first primary output and the first secondary output, wherein the first transfer switch contactor is movable between a first position in Which the first primary output is provided to the first distribution panel and a second position in which the first secondary output is provided to the first distribution panel;
    a second transfer switch contactor contained in the housing that receives the second primary output and the second secondary output, wherein the second transfer switch contactor is movable between a first position in which the second primary output is provided to the second distribution panel and a second position in which the second secondary output is provided to the second distribution panel;
    a first controller contained in the housing and connected to the first transfer switch contactors, wherein the first controller controls the movement of the first transfer switch contactors between the first and second positions; and
    a second controller contained in the housing and connected to the second transfer switch contactors, wherein the second controller controls the movement of the second transfer switch contactors between the first and second positions,
    wherein the first and second controllers communicate with each other to coordinate the movement of the first and second transfer switch contactors between the first and second positions.

2. The transfer switch of claim 1 further comprising a secondary power circuit breaker positioned between the secondary power source and the secondary power splitter.

3. The transfer switch of claim 2 wherein the secondary power circuit breaker is contained within the housing.

4. The transfer switch of claim 1 further comprising a first primary circuit breaker positioned between the primary power splitter and the first transfer switch contactor and a second primary circuit breaker positioned between the primary power splitter and the second transfer switch contactor.

5. The transfer switch of claim 4 wherein the first and second primary circuit breakers are located within the housing.

6. The transfer switch of claim 1 wherein the first and second controllers communicate with each other such that the first and second transfer switch contactors move between the first and second positions together.

7. The transfer switch of claim 1 further comprising a load management controller contained in the housing, wherein the load management controller is operable to control the supply of power to the plurality of loads to limit the power draw on the secondary power source.

8. A backup power management system connectable to a utility power source having a primary power splitter that divides the utility power source into a first primary output and a second primary output and provides power to a plurality of loads through a first distribution panel and a second distribution panel, the backup power management system comprising:
    a backup generator;
    a transfer switch having an enclosed housing;
    a secondary power splitter that receives power from the backup generator and divides the power into a first secondary output and a second secondary output;
    a first transfer switch contactor contained in the housing and connected to the primary power splitter to receive the first primary output and connected to the secondary power splitter to receive the first secondary output, wherein the first transfer switch contactor is movable between a first position in which the first primary output is provided to the first distribution panel and a second position in which the first secondary output is provided to the first distribution panel;
    a second transfer switch contactor contained in the housing and connected to the primary power splitter to receive the second primary output and connected to the secondary power splitter to receive the second secondary output, wherein the second transfer switch contactor is movable between a first position in which the second primary output is provided to the second distribution panel and a second position in which the second secondary output is provided to the second distribution panel;

a first controller contained in the housing and connected to the first transfer switch contactors, wherein the first controller controls the movement of the first transfer switch contactors between the first and second positions; and a second controller contained in the housing and connected to the second transfer switch contactors, wherein the Second controller controls the movement of the second transfer switch contactors between the first and second positions, wherein the first and second controllers communicate with each other to coordinate the movement of the first and second transfer switch contactors between the first and second positions.

9. The backup power arrangement of claim 8 further comprising a secondary power circuit breaker positioned between the secondary power source and the secondary power splitter.

10. The backup power arrangement of claim 9 wherein the secondary power circuit breaker is contained within the housing.

11. The backup power arrangement of claim 8 further comprising a first primary circuit breaker positioned between the primary power splitter and the first transfer switch contactor and a second primary circuit breaker positioned between the primary power splitter and the second transfer switch contactor.

12. The backup power arrangement of claim 11 wherein the first and second primary circuit breakers are located within the housing.

13. The backup power arrangement of claim 8 wherein the first and second controllers communicate with each other such that the first and second transfer switch contactors move between the first and second positions together.

14. The backup power arrangement of claim 8 further comprising a load management controller contained in the housing, wherein the load management controller is operable to control the supply of power to the plurality of loads to limit the power draw on the secondary power source.

15. A method of operating a power management system that provides power from a primary power source and a secondary power source to a plurality of loads through at least one distribution panel, the method comprising the steps of:

providing a transfer switch having an enclosed housing including both a first controller and a second controller contained within the housing;

dividing the primary power source into first and second primary outputs;

dividing the secondary power source into first and second secondary power outputs;

generating a control signal from the first controller to the first transfer switch contactor to move the first transfer switch contactor from a first position to a second position upon loss of the primary power source;

generating a signal from the second controller to the second transfer switch contactor to move the second transfer switch contactor from a first position to a second position upon loss of the primary power source;

generating a signal from the first controller to the first transfer switch contactor to move the first transfer switch contactor from the second position to the first position upon return of the primary power source;

generating a signal from the second controller to the second transfer switch contactor to move the second transfer switch contactor from the second position to the first position upon return of the primary power source; and communicating between the first and second controllers such that the first and second transfer switch contactors move between the first and second positions together.

16. The method of claim 15 wherein the first and second primary outputs are supplied to the at least one distribution panel through the first and second transfer switch contactors when the first and second transfer switch contactors are in the first position.

17. The method of claim 15 wherein the first and second secondary power outputs are supplied to the at least one distribution panel through the first and second transfer switch contactors when the first and second transfer switch contactors are in the second position.

18. The method of claim 15 further comprising the steps of:
positioning a circuit breaker between the primary power source and the first and second transfer switch contactors; and
positioning a circuit breaker between the secondary power source and the first and second transfer switch contactors.

19. The method of claim 16 wherein the first and second primary outputs are supplied to a first distribution panel and a second distribution panel when the first and second transfer switch contactors are in the first position and the first and second secondary outputs are supplied to the first and second distribution panels when the first and second transfer switch contactors are in the second position.

* * * * *